United States Patent
Braun et al.

[19]

[11] Patent Number: 6,060,984
[45] Date of Patent: May 9, 2000

[54] SYSTEM FOR MONITORING THE INFLATION PRESSURE OF A VEHICLE

[75] Inventors: Fritz Braun, Kernen; Tomas Hrycej, Ulm; Thomas Lich, Nellmersbach; Kurt-Juergen Merz, Stuttgart; Uwe Spieth, Altbach; Winfried Stiltz, Weinstadt, all of Germany

[73] Assignee: DaimlerChrysler AG, Stuttgart, Germany

[21] Appl. No.: 09/239,704

[22] Filed: Jan. 29, 1999

[30] Foreign Application Priority Data

Jan. 29, 1998 [DE] Germany .................. 198 03 386

[51] Int. Cl.$^7$ ............................................. B60C 23/02
[52] U.S. Cl. ................................. 340/442; 73/146.2
[58] Field of Search ................ 340/442; 73/146, 73/146.2, 146.5

[56] References Cited

U.S. PATENT DOCUMENTS

| | | | |
|---|---|---|---|
| 4,355,297 | 10/1982 | Sinha et al. | 340/443 |
| 5,285,523 | 2/1994 | Takahashi . | |
| 5,513,523 | 5/1996 | Sekiya et al. . | |
| 5,578,984 | 11/1996 | Nakajima | 340/444 |
| 5,629,478 | 5/1997 | Nakajima et al. | 73/146.2 |
| 5,907,097 | 5/1999 | Nakajima | 73/146.2 |
| 5,939,626 | 8/1999 | Tominaga et al. | 73/146.2 |

FOREIGN PATENT DOCUMENTS

| | | |
|---|---|---|
| 0 455 993 | 11/1991 | European Pat. Off. . |
| 0 729 855 | 9/1996 | European Pat. Off. . |
| 29 05 931 | 8/1980 | Germany . |
| 39 37 403 | 5/1991 | Germany . |
| 43 40 746 | 6/1994 | Germany . |
| 44 09 816 | 9/1994 | Germany . |
| 196 19 393 | 1/1997 | Germany . |

*Primary Examiner*—Edward Lefkowitz
*Attorney, Agent, or Firm*—Evenson, McKeown, Edwards & Lenahan, PLLC

[57] ABSTRACT

A system for monitoring the vehicle tire inflation pressure has a device for detecting the vertical acceleration of the tire or of a vehicle component connected therewith and the longitudinal speed of the vehicle, as well as having an analyzing unit which determines the tire inflation pressure from the measured vertical acceleration data and the measured vehicle longitudinal speed data. The analyzing unit contains a trainable estimating unit, particularly a neuronal network, which is trained by predeterminable training example data with different tire inflation pressure values and vehicle longitudinal speed values. In the trained condition, the estimating unit determines the tire inflation pressure at least as a function of the measured vertical acceleration and vehicle longitudinal speed data fed directly or preprocessed on an input side thereof. The system provides continuous tire inflation pressure monitoring in the case of road vehicles.

15 Claims, 10 Drawing Sheets

SYSTEM FOR MONITORING THE INFLATION PRESSURE OF A VEHICLE

BACKGROUND AND SUMMARY OF THE INVENTION

This application claims the priority of German Application No. 198 03 386.9, filed Jan. 29, 1998, the disclosure of which is expressly incorporated by reference herein.

The invention relates to a system for monitoring the inflation pressure of a vehicle tire having a device for detecting at least the vertical acceleration of the tire or of a vehicle component connected with the tire and the vehicle longitudinal speed, and an analyzing device which determines the tire inflation pressure from the measured vertical acceleration data and the measured vehicle longitudinal speed data. By means of systems of this type, it is possible to continuously monitor the tire inflation pressure,—in the following, also simply called "tire pressure"—also when the vehicle is driving. This makes it possible to detect excessive pressure drops in time.

It is known to derive the pressure of vehicle tires indirectly from rotational wheel speed measurements, which frequently are required anyhow; for example, for an antilock system and/or a wheel slip control system. As disclosed, for example, in German Published Patent Applications DE 44 09 816 A1 and DE 196 19 393 A1 as well as U.S. Pat. No. 5,513,523, these systems indirectly monitor the tire pressure normally using comparative operations between rotational wheel speeds of different vehicle wheels. They therefore usually permit only the detection of the pressure drop of one tire relative to other tires, but not an absolute determination of the tire pressure value.

From U.S. Pat. No. 5,285,523, the use of several parallel neuronal (or "neural") networks with different characteristics is known in a system for detecting the driving condition of a vehicle, in which case particularly the type of driven road, that is, an autobahn or a city road, etc., and the traffic situation, are to be determined while taking into account the detected driver behavior.

German Published Patent Application DE 43 40 746 A1 discloses a diagnostic system which, among other things, also permits a monitoring of the pressure of vehicle tires. In the process, the system uses a non-trainable estimating unit in the form of a so-called condition observer, in which case the dynamic system consisting of a wheel suspension and of a wheel is described by a pertaining condition differential equation system, on which the condition observer or the condition estimator is based.

From German Patent Document DE 29 05 931 C3, it is known to monitor the pressure of a vehicle tire indirectly based on detecting the vertical acceleration of the tire or of a vehicle part connected therewith. Specifically, by means of this known system, individual spectral fractions of the detected vertical acceleration information are analyzed for the monitoring of the tire pressure. For this purpose, the system contains per vehicle wheel, either an acceleration sensor and two parallel analyzing circuits which analyze different frequency ranges or a first acceleration sensor on a supporting component of each wheel and a second acceleration sensor at a point on the vehicle body situated close to the wheel as well as one analyzing circuit respectively which is connected behind the acceleration sensors and has a band pass frequency filter. The respective frequency filters are in both cases followed by a rectifier and an integrator. A comparison unit connected behind the analyzing circuit compares the analyzing information of a respective analyzing circuit with that of another analyzing circuit or with predetermined threshold values in order to monitor the tire pressure and the shock absorbers for each wheel.

German Published Patent Application DE 39 37 403 A1 furnishes the general teaching of detecting vibrations on the wheel carriers of a vehicle wheel at least in the vertical and in the longitudinal direction. This system uses the thus obtained vibration information, for example, for monitoring the tire inflation pressure. This known system is adaptively designed such that it learns the natural frequency of each wheel suspension over an extended period of time.

European Published Patent Application EP 0 455 993 A2 discloses a system for determining and/or monitoring the condition of a technical component of a motor vehicle, such as the tires, with respect to the tire pressure. Vibrations introduced into the chassis of the vehicle are measured on components of the wheel suspension relative to the vehicle body. In this case, values of the particularly stochastically excited vibrations of components of different wheel suspensions coupled with the technical component are measured and are processed to form characteristic values which are compared with assigned characteristic values previously determined in the same manner while determining deviations in a predetermined vehicle-specific frequency range. In this known system, the detection of the tire pressure comprises the measurement of the vertical accelerations on at least one wheel of the front axle and one wheel of the rear axle. From these measurements, a transmission function is determined which is relevant for the tire pressure determination and which formally links the forward wheel axle with the rearward wheel axle, which is physically implemented in a complex form by way of the vehicle body.

From European Published Patent Application EP 0 729 855 A1, it is known to use a previously trained neuronal network for determining the inflation pressure. The training takes place by means of example data with different tire inflation pressure values and vehicle condition values, such as vehicle longitudinal speed values, acceleration values and braking values, as well as straight ahead drive and cornering values. In a subsequent operating phase, the tire pressure is determined from the corresponding measured input quantities by the trained network.

The invention is based on the technical problem of providing a system of the above-mentioned type by which the vehicle tire inflation pressure can be determined at relatively low expenditures and with a comparatively high precision and stability. As required, the tire pressure is determined individually and separately for each vehicle wheel without the necessity of taking into account measurements on other vehicle wheels.

The invention solves this problem by providing a system having a device for detecting at least the vertical acceleration of the tire or of a vehicle component connected with the tire and the vehicle longitudinal speed, and an analyzing device which determines the tire inflation pressure from the measured vertical acceleration data and the measured vehicle longitudinal speed data. The analyzing device comprises a trainable estimating unit, particularly a neuronal network, which is trained by means of predeterminable training example data with various tire inflation pressure values and vehicle longitudinal speed values. In the trained condition, the analyzing unit determines the tire inflation pressure at least as a function of the measured vertical acceleration data and measured vehicle longitudinal speed data fed on the input side directly or in preprocessed form. For monitoring the tire inflation pressure by means of this system, the measured values of the vertical acceleration of the tire or of a vehicle component connected therewith, as well as of the vehicle longitudinal speed—in the following, also simply called "vehicle speed"—, will be sufficient. By using the trainable estimating unit, the system provides tire inflation pressure monitoring having a high precision and stability, in which case the absolute tire inflation pressure can be determined for each wheel individually. Furthermore, the system has one or several additional components, as described in the following.

As a first component, a device is provided for generating road condition information as a function of measured vertical acceleration data and of the measured vehicle longitudinal speed data, by which the activation and the deactivation of the estimating unit is controlled as a function of whether the momentary vertical acceleration and vehicle longitudinal speed are in each case inside or outside pertaining predeterminable value ranges. As a result, the active operation of the estimating unit can be limited to those situations which are in the range for which the estimating unit had previously been trained.

As a second component, devices for suppressing those estimated values of the estimating unit which result from situations outside the range for which the estimating unit was trained are connected behind the estimating unit.

As a third component, the vertical acceleration information is subjected to a preprocessing by means of a pertaining device which contains at least one analog-digital converter unit and a system condition determination unit connected behind. The latter computes one or several time derivatives of the measured vertical acceleration and supplies this information, in addition to the measured vertical acceleration itself, to the estimating unit as input quantities.

As an alternative to this derivation unit, a preprocessing unit provided as a fourth component contains an FFT unit behind an analog-digital converter unit, for carrying out a Fast Fourier Transformation, and a selection unit connected behind it by which those spectral fractions can be selected from the output signal of the FFT unit which contain the significant information concerning the tire inflation pressure.

As a fifth component, a data memory and an evaluating and optimizing stage are provided. The data memory is used instead of the estimating device in a training example data recording phase and in this recording phase stores the received training example data. In a training phase following the recording phase, the data memory and the evaluating and optimizing stage are connected behind the estimating unit in order to train it by means of the training example data furnished to it by the data memory.

In a system further developed according to the invention, the preprocessing unit contains an anti-aliasing filter which is connected in front of the analog-digital converter unit and prevents scanning errors of the analog-digital converter unit.

In a system further developed according to the invention, the preprocessing unit contains a digital low-pass smoothing filter which follows the analog-digital converter unit and which has a high-pass offset filter which follows it. As a result of the signal smoothing caused by the low-pass smoothing filter, a clearly lower scanning rate can be used in the high-pass offset filter. In addition, the high-pass offset filter compensates for any drift of the conventional vertical acceleration sensors which is in a minute range.

Other objects, advantages and novel features of the present invention will become apparent from the following detailed description of the invention when considered in conjunction with the accompanying drawings.

DETAILED DESCRIPTION OF THE DRAWINGS

The illustrated embodiments of the invention are all based on the principle of analyzing the vertical component of the axle acceleration of a respective vehicle axle for the indirect continuous determination and, therefore, monitoring of the tire inflation pressure of a vehicle. In the following, the tire inflation pressure will also be abbreviated as "tire pressure". This is done by means of a trainable estimating unit, particularly a neuronal network. The use of such a trainable estimating unit permits a closed analysis of the axle acceleration signal, the estimating unit being capable of separating the stochastic excitation by the road from the reaction of the chassis and, as a result, estimating the absolute tire pressure. The analysis takes place independently for each wheel individually. The only auxiliary quantity required is the vehicle longitudinal speed V, in the following simply called "vehicle speed" which is generally available in the vehicle anyhow.

By means of training using examples concerning the dynamic behavior of the chassis at different tire pressures, the analyzing system can be adapted in a respective suitable manner to the various application conditions. In an initial recording phase, the axle accelerations are detected at different tire pressures when driving a specifically selected test course and, after passing through a special signal preprocessing system, are recorded on a data carrier together with the tire pressures measured directly in this phase, as well as the vehicle speed. In a subsequent training phase, by means of the recorded training example data, the estimating unit is then trained using an optimizing process such that its tire pressure prognosis coincides as much as possible with the recorded tire pressure within a selected speed range. After this training, the estimating unit is used in actual application operation such that, after the signal preprocessing, the axle acceleration signal is processed directly by the estimating unit for determining the tire pressure. Taking into account the momentary vehicle speed and the road condition, the result of the tire pressure estimation is still smoothed by a filter to the extent required for a reliable, interference-free estimation of the tire pressure.

Figure 1:
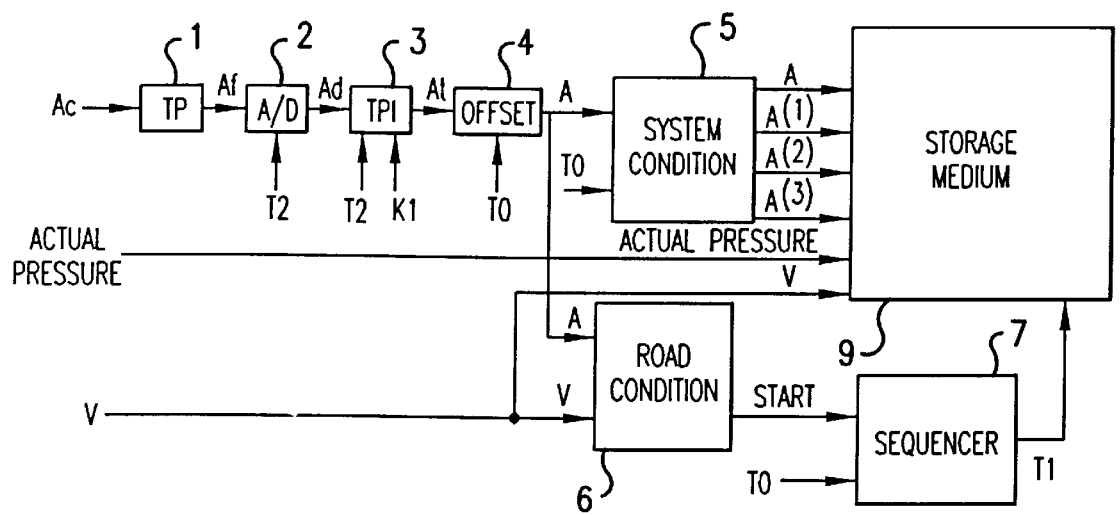
FIG. 1 is a block diagram of an arrangement for recording training example data for training an estimating unit of a first embodiment of a system for monitoring a vehicle tire inflation pressure according to the invention.

FIG. 1 shows the arrangement for recording the training example data used in the recording phase. The arrangement contains a multi-step preprocessing unit which, connected serially behind one another, contains an analog low-pass filter 1, an analog-digital converter 2, a digital low-pass filter 3 and a high-pass offset filter 4. The analog low-pass filter 1 converts the measuring signal Ae obtained from a conventional axle acceleration sensor system, which is not shown, and containing the momentary vertical axle acceleration into an output signal Af with a limit frequency of approximately 150 Hz and a sufficient steepness such that, at a scanning rate of, for example, T2=0.00025 s in the output signal Ad of the analog-digital converter 2 which follows, no so-called aliasing effects occur which would interfere with the further digital computer processing. A commercially available integrated circuit with, for example, a 12 bit resolution can be used as the analog-digital converter 2. The digital signal Ad emitted by the analog-digital converter 2 is converted in the digital filter 3, which follows, into a smoothed output signal At such that in the next component a change can take place to a significantly slower scanning rate of, for example, T0=0.002 s.

Figure 2:
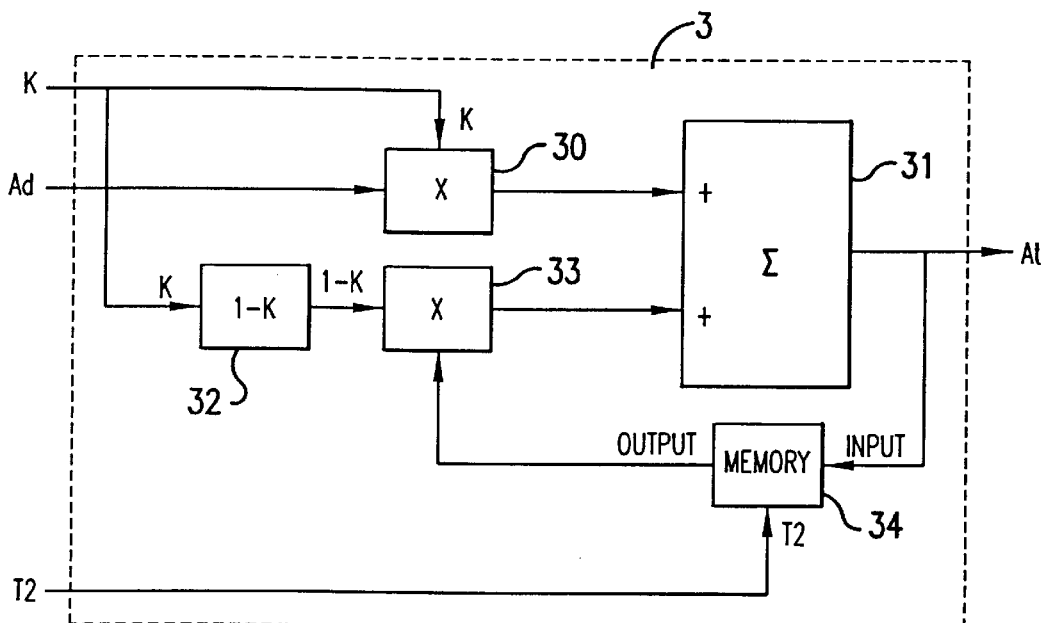
FIG. 2 is a block diagram of a digital low-pass filter used in a preprocessing unit of FIG. 1.

FIG. 2 is a detailed block diagram of the digital filter 3. In a multiplier 30, the input signal Ad is multiplied with a filter constant K=K1 and is then fed to an adder 31. In parallel thereto, a factor formation step 32 forms the factor 1-K which is fed to a multiplier 33 for the purpose of a multiplication with the content of a memory 34, this multiplication result being fed to a second input of the adder 31. The adder output signal, which forms the output signal At of the filter 3, is fed to an input of the memory 34 which provides for a feedback of the output signal At to take place synchronously with the scanning timing T=T2. The low-pass filter 3 is correspondingly updated at discrete points in time. All other digital low-pass filters provided in the illustrated embodiments are of a construction corresponding to FIG. 2, unless indicated otherwise.

Figure 3:
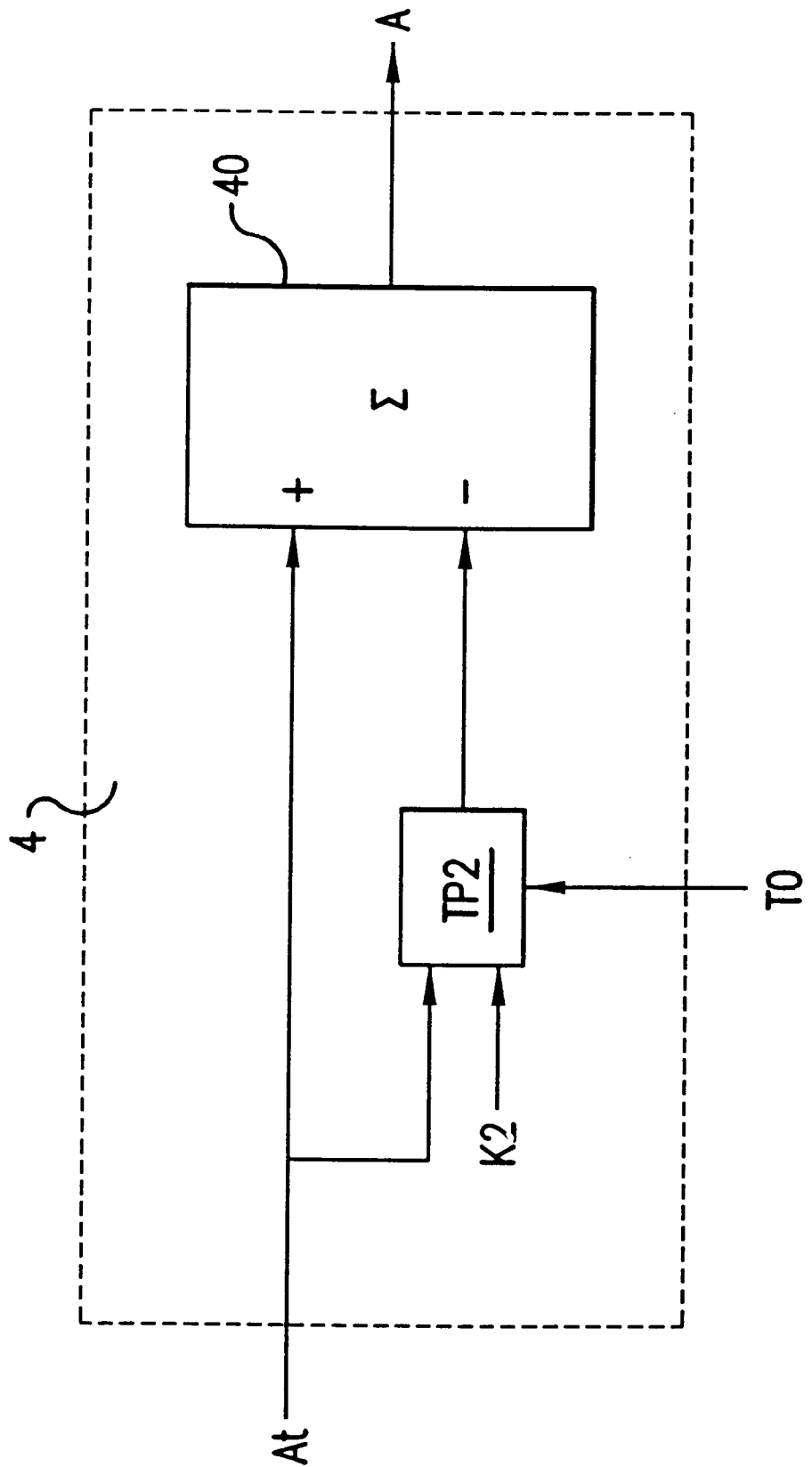
FIG. 3 is a block diagram of a high-pass offset filter used in the preprocessing unit of FIG. 1.

The high-pass offset filter 4 is used, on the one hand, for reducing the scanning rate and, on the other hand because of its high-pass characteristics, for compensating the drift of the axle acceleration sensor system which is in the minute range. The block diagram of FIG. 3 provides a more detailed view of the construction of the high-pass offset filter 4. In a subtracter 40, the output signal of a low-pass filter TP2 of the first order is subtracted from the signal At, fed on the input side, of the digital low-pass filter 3 connected in front. The output signal representing the axle acceleration A is formed in this manner. The low-pass filter TP2 of the first order determines the limit frequency by means of its filter constant K2, and the timing signal T0 fed to it determines the point in time at which the filtered output signal A is updated. The timing signal T0 is, for example, selected such that the update rate is reduced by the factor eight, so that, for example, a scanning rate of 2 ms is obtained.

Figure 4:
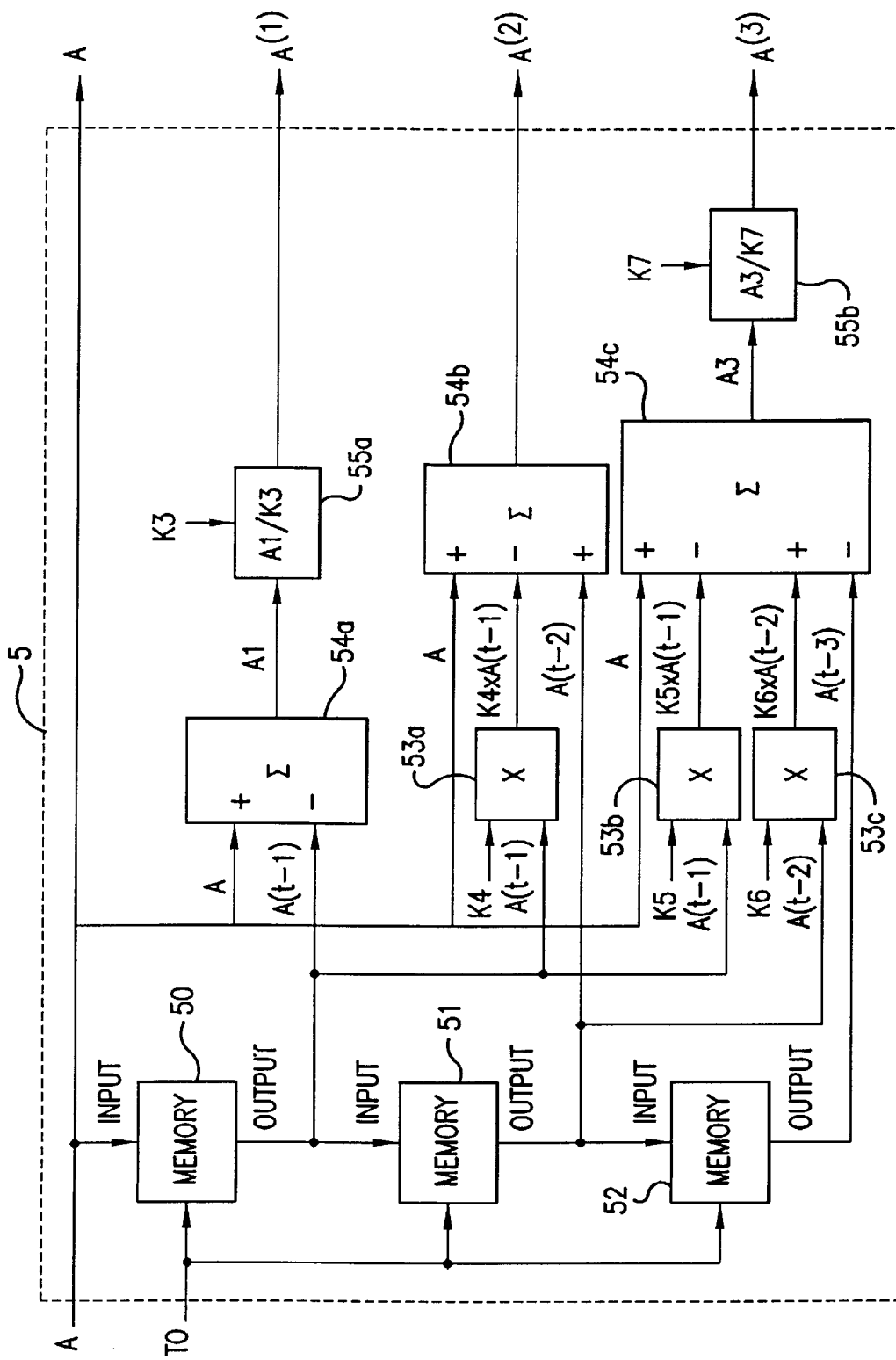
FIG. 4 is a block diagram of a system condition determination unit used in the arrangement of FIG. 1.

According to FIG. 1, a system condition determination unit 5 is connected behind the preprocessing unit, the construction of the system condition determination unit 5 being illustrated in greater detail in FIG. 4 in a largely self-explanatory manner. The system condition determination unit 5 is used for determining the time-related dynamics of the measured and preprocessed vertical axle acceleration A. On the one hand, it allows this axle acceleration information A itself to pass and, on the other hand, it determines from the information A its first time derivative $A^{(1)}$, its second time derivative $A^{(2)}$ and its third time derivative $A^{(3)}$ as a function of the timing T0. For this purpose, three corresponding input-side storage elements (registers) 50, 51, 52 are provided which are serially connected behind one another and which, at the respective timing point in time of the timing signal T0, pass the input-side information over their output and store it until the next T0-timing pulse. As a result, the storage element chain 50, 51, 52 functions as a delay line and generates signals A(t-1), A(t-2) and A(t-3) from which, by means of appropriately arranged multipliers 53a, 53b, 53c and adders 54a, 54b, 54c as well as two dividers 55a, 55b, according to a conventional algorithm, the values $A^{(1)}$, $A^{(2)}$, $A^{(3)}$ of the first, second and third time derivative of the vertical axle acceleration A are formed. Suitable scaling or multiplication factors K3 to K7 are used in this case.

Figure 5:
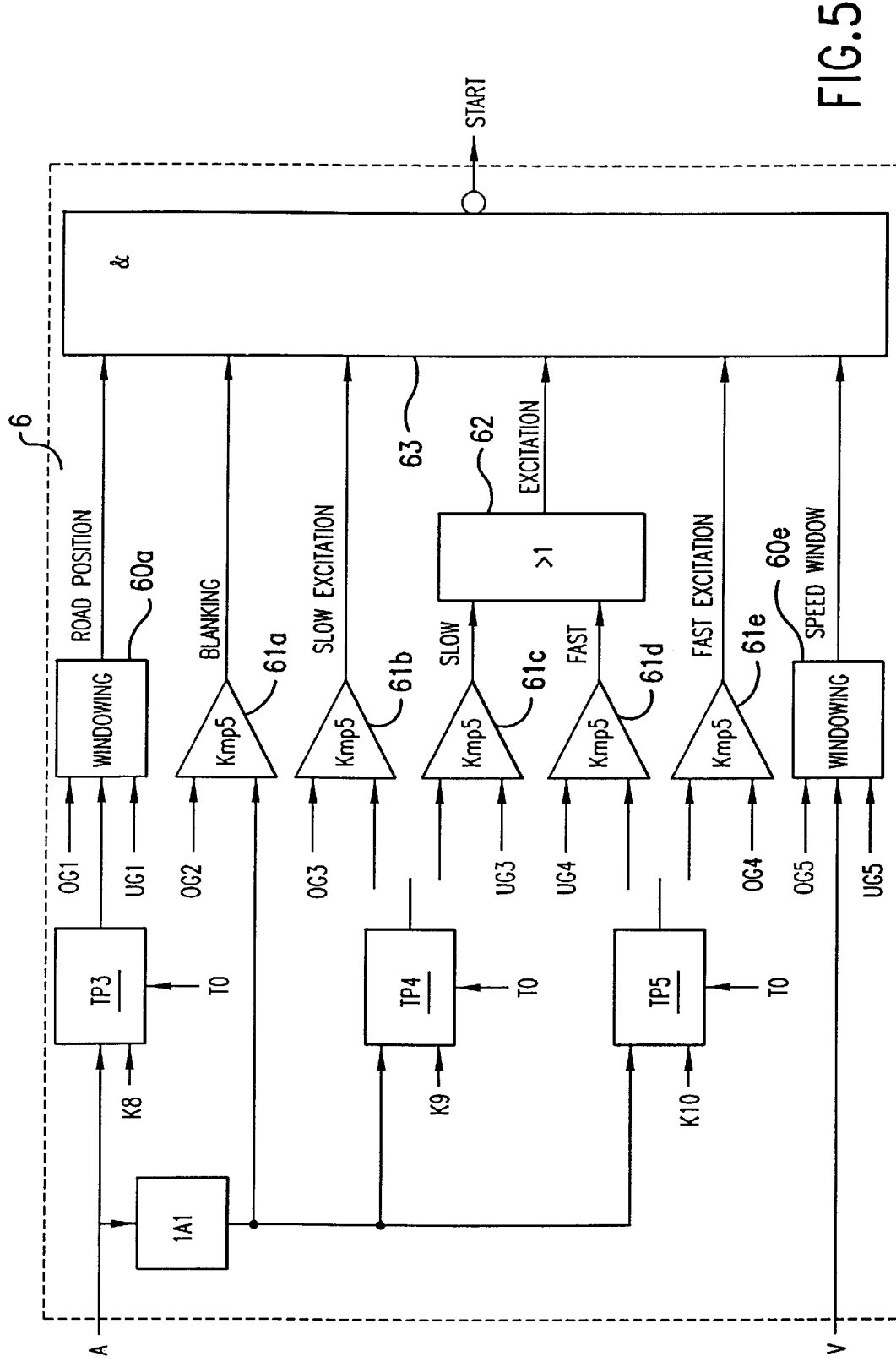
FIG. 5 is a block diagram of a road condition determination unit used in the arrangement of FIG. 1.

In parallel to the system condition determination unit 5, a road condition determination unit 6 is provided in the arrangement of FIG. 1, the construction of this road condition determination unit 6 being illustrated in greater detail in FIG. 5. The road condition determination unit 6 has the purpose of evaluating the characteristics of the course driven by the vehicle—in the case of a road vehicle, therefore a road—as a function of the vehicle speed V and, as a function thereof, emit a "start" release signal. For this purpose, the axle acceleration signal A is low-pass filtered by way of a digital low-pass filter TP3 and, in a windowing unit 60a, which follows, is subjected to a windowing which, in the case of considerably changing road grades, inactivates the "start" release signal when the input signal is outside of the defined window.

Figure 6:
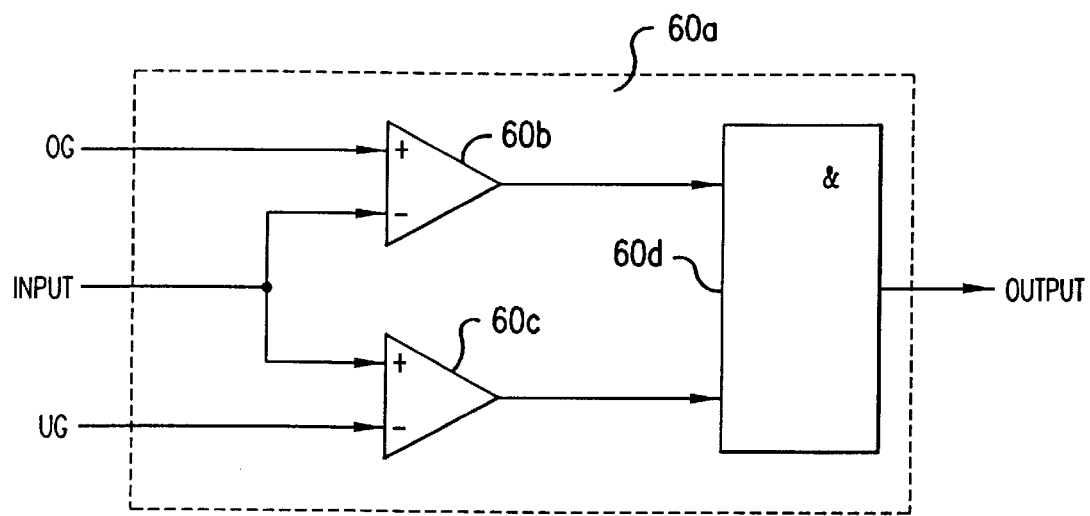
FIG. 6 is a block diagram of a windowing unit used in the road condition determination unit of FIG. 5.

FIG. 6 is a more detailed view of the construction of the windowing unit 60a. The low-pass-filtered axle acceleration signal present at the input is fed to the inverting input of a first comparator 60b and to the non-inverting input of a second comparator 60c which is in parallel to the first. A predeterminable upper limit value OG is fed to the non-inverting input of the first comparator 60b, while a predeterminable lower limit value UG is fed to the inverting input of the second comparator 60c. An AND unit 60d, which follows, carries out an AND operation of the two comparator output signals for generating the windowing output signal. Thus, the windowing unit 60a emits a releasing high signal level precisely when the input signal is within the range fixed by the lower limit value UG and the upper limit value OG.

The "start" release signal is also rendered inactive when the axle acceleration quantity [A] exceeds a predeterminable limit value OG2, which is recognized by a pertaining comparator 61a. Two additional digital low-pass filters TP4, TP5, together with four pertaining additional comparators 61b to 61e, insure that the "start" release signal is not activated if the axle acceleration quantity [A], when taking into account the time constants differently selected for the low-pass filters TP4, TP5, is outside respective value ranges which are each defined by a pertaining lower limit value UG3, UG4 and a pertaining upper limit value OG3, OG4. The output signals of two comparators 61c, 61d are also queried in a corresponding logical operation unit 62 as to whether they are both at a high level or not. The monitoring of a vehicle speed window defined by a corresponding lower limit value UG5 and upper limit value OG5 takes place in a second windowing unit 60e which has a construction identical to that of the windowing unit 60a of FIG. 6. Only if all above-mentioned conditions have been met, will the "start" release signal be emitted, which takes place by a corresponding logical AND unit 63, to which the different windowing and comparator output signals are fed.

Figure 7:
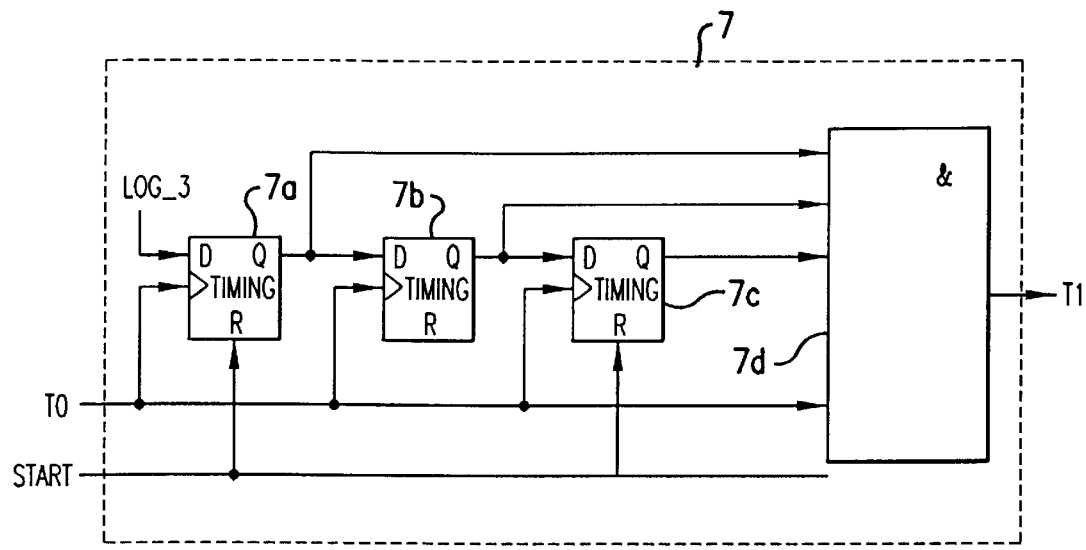
FIG. 7 is a block diagram of a sequencer used in the arrangement of FIG. 1.

The "start" release signal of the road condition determination unit 6 is fed to a sequencer 7 which follows and whose construction is shown in greater detail in FIG. 7. In this sequencer 7, a counter is formed from the "start" input signal and the fed timing signal TO, which counter insures that a timing signal T1 for updating a memory 8 connected behind, as illustrated in FIG. 1, during the recording phase as well as the estimating unit in the later application phase, is always generated only when a valid road condition will in each case last until all time derivatives $A^{(1)}$, $A^{(2)}$, $A^{(3)}$ have been computed in the system condition determination unit 5. The signal abbreviations D, Q and R indicated in FIG. 7 correspond to the designations customary in digital technology, as used, for example, for D-flip-flops. Thus, D in each case indicates a data input whose signal condition is delivered again at the To timing pulse to the output Q. A logical AND unit 7d is then connected behind three such serially connected units 7a, 7b, 7c.

The system condition determination unit 5 is followed by a digital storage medium, such as a RAM, ROM EPROM, EEPROM or a hard disk, floppy disk or CD, which stores the information A, $A^{(1)}$, $A^{(2)}$, $A^{(3)}$ determined by the system condition determination unit 5 concerning the time-related dynamics of the vertical axle acceleration A. The medium also stores the momentary vehicle speed V and the current measured tire pressure as an actual pressure value together with the timing signal T1 furnished by the sequencer 7 as training example data, by means of which subsequently a trainable estimating unit is optimized by training.

Figure 8:
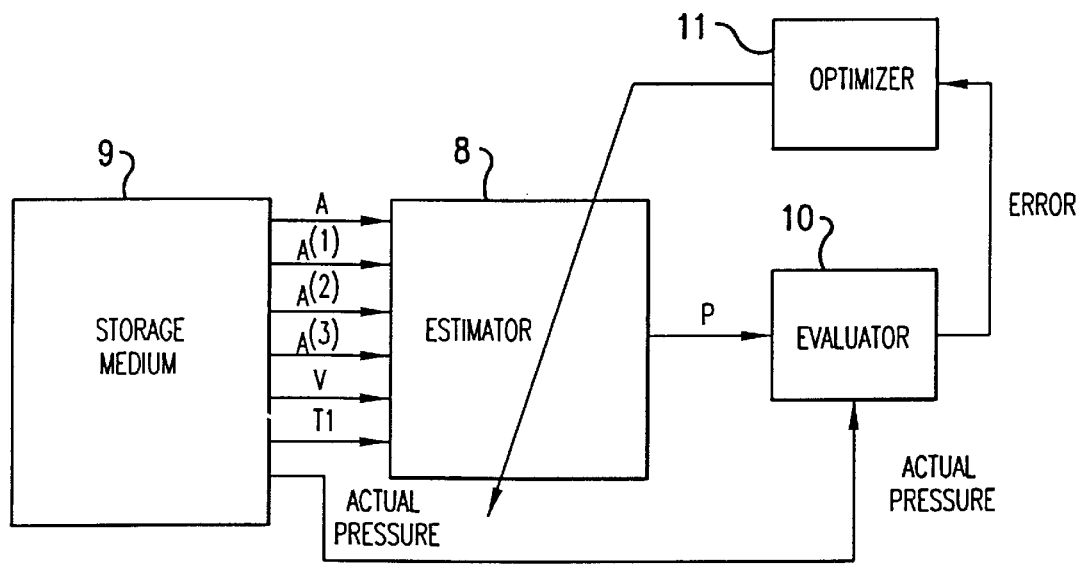
FIG. 8 is a block diagram of an arrangement for training the estimating unit by means of training example data received by means of the arrangement of FIG. 1.

This training takes place by means of an arrangement indicated in FIG. 8. For the training, the previously recorded training example data filed in the memory 9 concerning the vertical axle acceleration signal A, its first, second and third derivative $A^{(1)}$, $A^{(2)}$, $A^{(3)}$ as well as the vehicle speed V together with the scanning cycle T1 are fed as road condition information to the trainable estimating unit 8, which is preferably implemented as a neuronal network, such as a so-called multi-layer perceptron network. A sequence of different recordings at different tire pressures together with the respective actual pressure are called up and are used for optimizing the estimating unit 8. In this case, an evaluating unit 10 compares the estimated tire pressure value P furnished by the estimating unit 8 with the actual pressure. The derived error signal is fed to an optimizing unit 11 which correspondingly acts upon the estimating unit 8; i.e. correspondingly newly sets its free parameters. As training example data, those data may, for example, be used in the case of which the tire pressure is varied at spacings of 5% relative to the normal tire pressure and the vehicle speed is varied in a predetermined speed range of, for example, 25 km/h to 60 km/h. It is found that acceleration and deceleration operations as well as vehicle load changes have only a slight influence on the estimation of the tire pressure.

Figure 9:
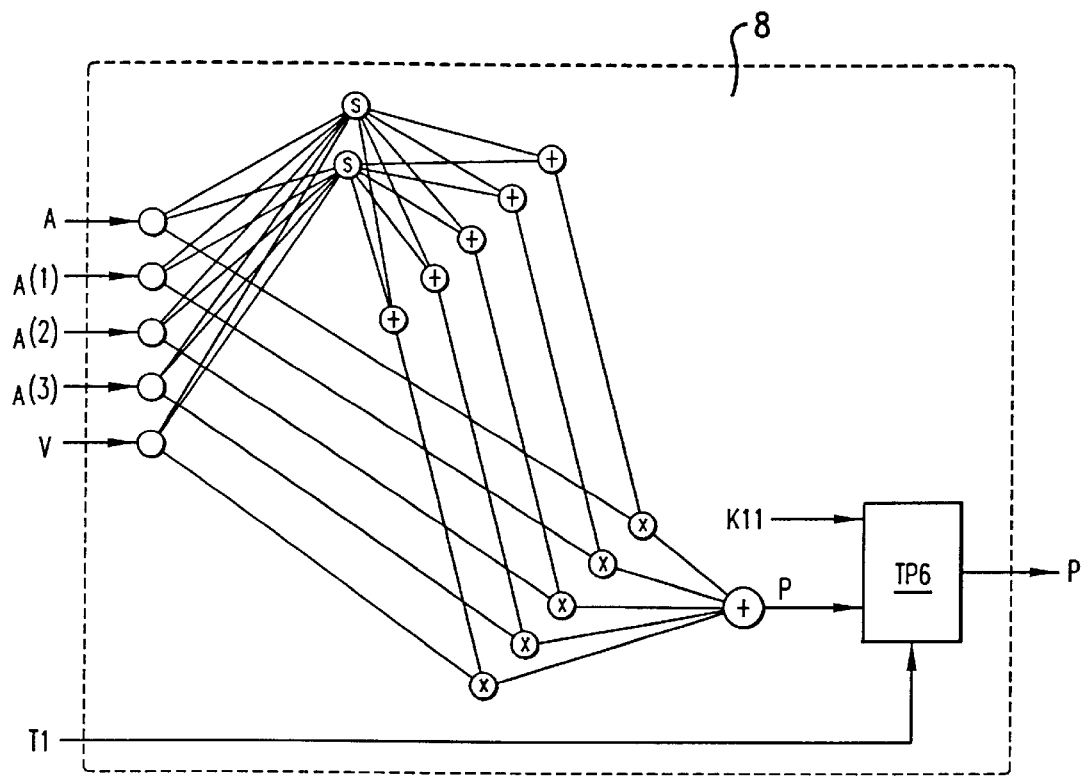
FIG. 9 is a block diagram of the estimating unit of FIG. 8.

FIG. 9 is a more detailed view of the construction of the estimating unit 8 with a multi-layer perceptron network. The vertical axle acceleration A, its first to third derivatives $A^{(1)}$, $A^{(2)}$, $A^{(3)}$ and the vehicle speed V are fed to the input layer neurons. In the adjoining layers, the blocks marked "+" carry out an addition of all inputs; in contrast, the blocks marked "×" carry out a multiplication of the fed signals. The blocks marked "S" compute as the output signal the value of the function 1/(1+exp(−SUM)), SUM being the sum of all block inputs. The number of "S"-blocks is variable; FIG. 9, in a representative manner, for reasons of clarity, showing only two S-blocks. On the output side, the estimating unit 8 contains a time-discrete low-pass filter TP6 with a suitable time constant K11, which, as a rule, is in the second range. All edges between the input blocks and the "S" blocks as well as between the "S" blocks and the multiplication blocks, which follow, are provided with variable weightings, as generally known with respect to such neuronal networks. From the theory of neuronal networks, it is also known that, in the case of a sufficient number of "S" nodes, by means of an appropriate selection of weighting values, an arbitrary imaging can be displayed; see the so-called functional approximation by the Multi-Layer Perceptron Network. The estimator structure according to FIG. 9 therefore consists of a nonlinear function with the arguments A, $A^{(1)}$, $A^{(2)}$, $A^{(3)}$, V, whose value is smoothed by the low-pass filter TP6.

Figure 10:
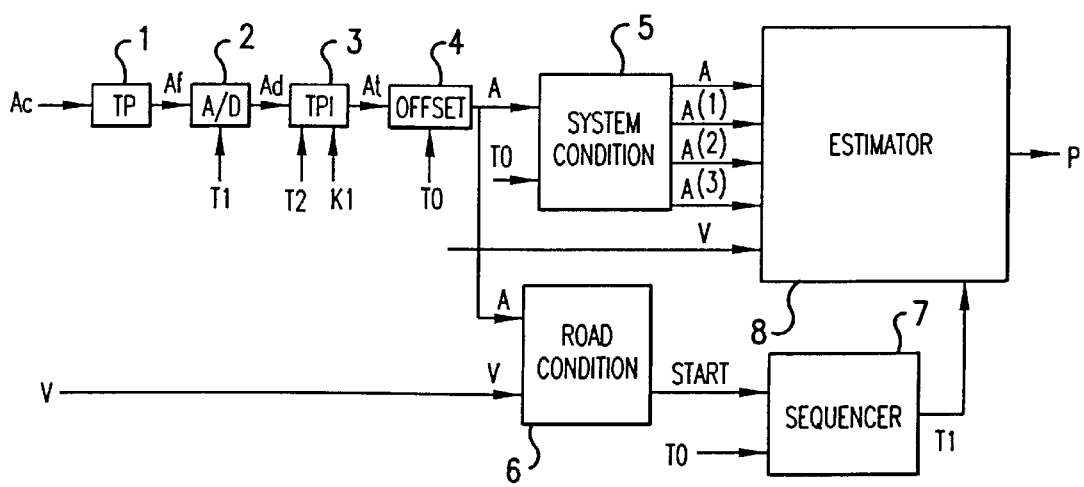
FIG. 10 is a block diagram of the arrangement for the vehicle tire inflation pressure monitoring by means of the estimating unit trained by the arrangement of FIG. 8.

For determining those weightings for which the estimating unit 8 reaches an optimal performance, a conventional numerical optimizing process is used. The function which is to be minimized in this case has the characteristic that it has its minimum where the estimating unit 8 has optimal characteristics, that is, precisely those demanded from it. The process of optimizing the estimator unit to a minimum of the sum of square spacings between each measured value and the respective estimated value is unsuitable in the present case because, in the case of a nonlinear estimating unit, the minimal square spacing offers to guarantee that the estimator is undistorted; that is, supplies a precise estimation on average over a long time period. In the present case of the estimation of tire pressure, because of the unknown interfering road excitation, any individual estimation is burdened by such a large random error that only a long-term average value of these estimates over several seconds can be utilized. However, this long-term average value will be in the proximity of the true pressure value only if the estimating unit operates in an undistorted manner. In the present case, it is therefore provided for optimizing the estimating unit 8 to minimize the square deviation of the average pressure value estimated over a certain number of scanning periods from the average measured value. This can take place by any numerical optimizing process familiar for this purpose to a person skilled in the art, FIG. 10 shows the above-described trained estimating unit 8 in its application phase; that is, when used within a system for monitoring the vehicle tire inflation pressure. As illustrated in FIG. 10, the system contains the preprocessing unit, which was used in the recording phase, and has the analog low-pass filter 1, the analog-digital converter 2, the digital low-pass filter 3 and the high-pass offset filter 4. As further components, in addition to the trained estimating unit 8, the system condition determination unit 5, the road condition determination unit 6 and the sequencer 7 are provided, which had also been used in the recording phase. The construction of the tire pressure monitoring system according to FIG. 10 corresponds to that of the data recording arrangement of FIG. 1 with the exception that the memory 9 is replaced by the trained estimating unit 8 and there is no longer an actual pressure signal. The timing signal T1 emitted by the sequencer 7 provides that, in the application phase, the estimating unit 8 is activated only when the requirements for the road condition have been met for a sufficiently long time so that the optimized trained estimating unit 8 will be capable of carrying out the processing of the time-related dynamics of the vertical axle acceleration A including its first three derivatives $A^{(1)}$, $A^{(2)}$, $A^{(3)}$, together with the vehicle speed V for the purpose of an indirect determination of the pertaining tire pressure P. The tire pressure monitoring system bridges those phases in which a reliable estimation is not possible because of unsuitable road excitations in that the road condition is observed by means of the road condition determination unit 6 and by way of this unit 6, the unsuitable phases are extracted. It is understood that, by means of this system, the absolute tire pressure for each vehicle wheel individually can be determined independently of the other vehicle wheels in an indirect manner. Furthermore, it is understood that, instead of the described sensing of the vertical axle acceleration, the vertical acceleration of any other vehicle component connected with the monitored vehicle tire, particularly of the wheel suspension, can be sensed and can be used for determining the tire pressure.

Figure 11:
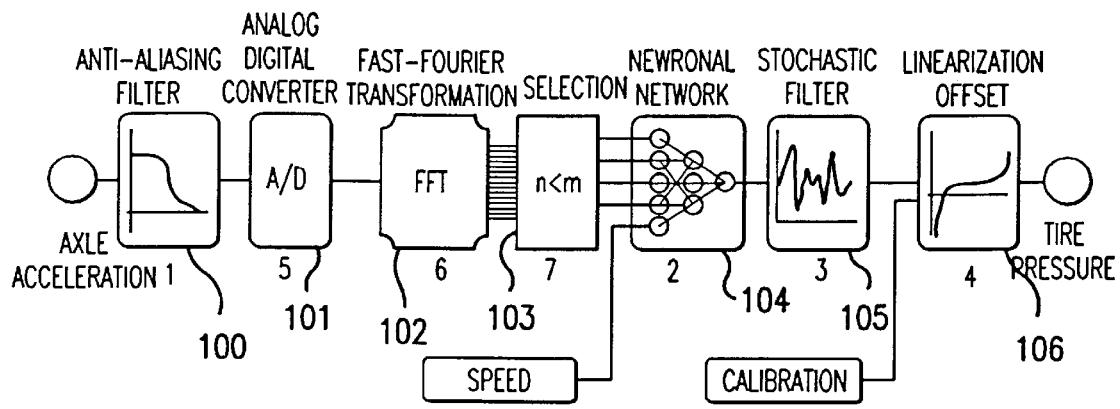
FIG. 11 is a block diagram of a second embodiment of a system for monitoring a vehicle tire inflation pressure.
Figure 12:
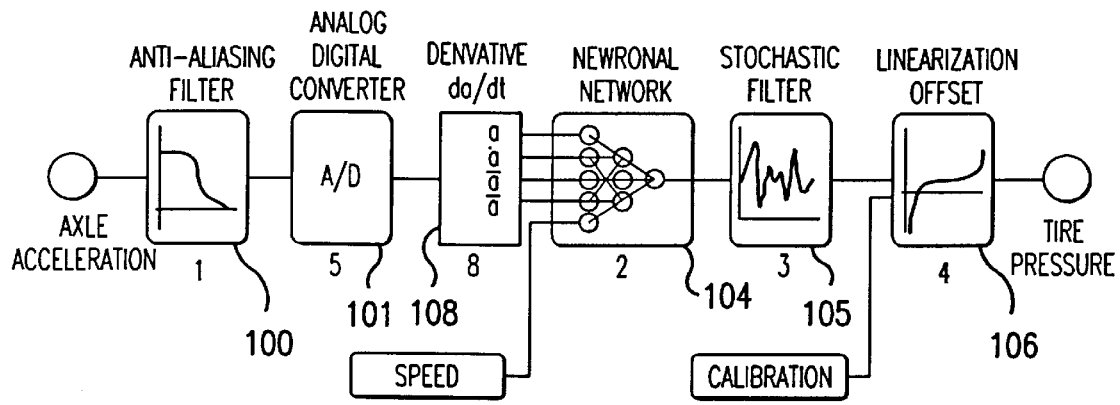
FIG. 12 is a block diagram of a third embodiment of a system for monitoring a vehicle tire inflation pressure.
Figure 13:
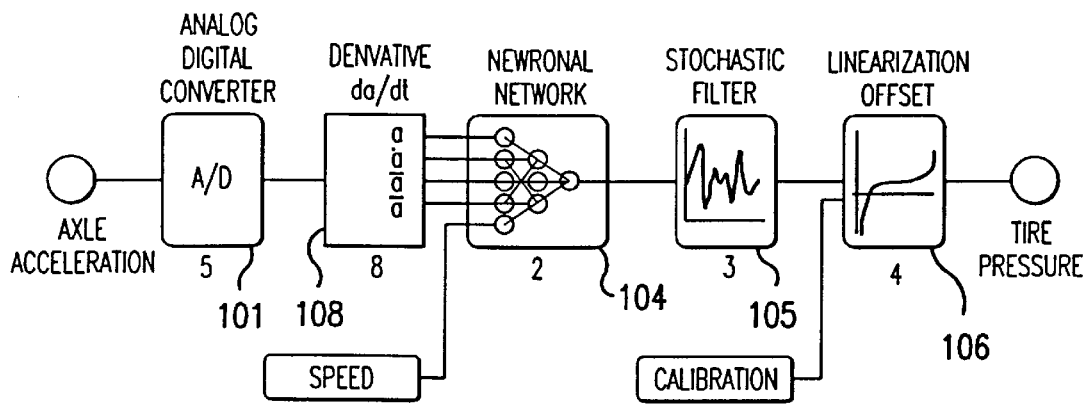
FIG. 13 is a block diagram of a fourth embodiment of a system for monitoring a vehicle tire inflation pressure.

Additional possible implementations of the vehicle tire inflation pressure monitoring system are illustrated in FIGS. 11 to 13. The system according to FIG. 11 contains a preprocessing unit which, on the input side, comprises an anti-aliasing filter 100, which filters the vertical axle acceleration signal. Following this filter 100, an analog-digital converter 101, an FFT unit 102 for carrying out a Fast-Fourier-Transformation and a selection unit 103 are provided. The anti-aliasing filter 100 prevents scanning errors by the connected analog-digital converter 101 and is selected such that the system dynamics are sufficiently reflected in the measuring data. The analog-digital converter 101 digitizes the fed analog and filtered axle acceleration signal at a scanning rate and resolution selected according to the system dynamics. The FFT unit 102 disassembles the digitized axle acceleration signal into its spectral components, and the selection unit 103 selects those spectral components which contain the essential information concerning the tire pressure.

The preprocessing unit is followed again by a neuronal multi-layer perceptron network 104, as the trainable estimating unit, which contains, for example, three to four forward coupled layers, that is, one or two hidden layers between the input layer and the output layer, and has the function of drawing a conclusion from the spectral components of the axle acceleration information furnished by the selection unit 103 concerning the pertaining tire pressure. It is appropriately trained for this purpose in a training phase preceding the actual application phase, in which training phase the preprocessing unit is already active. In this training phase, the difference between the output signal of the neuronal network 104 and the pertaining measured actual tire pressure value which forms the desired output signal value for the neuronal network 104, is used by means of an optimizing algorithm for adapting the weightings between the neuron layers. In a manner known per se, the selection of the training examples determines the characteristics of the trained neuronal network 104 also with respect to the evalution of the tire pressure.

A stochastic filter 105, which is connected behind the neuronal network 104, is used for stabilizing the estimated tire pressure values furnished by the network 104. A linearization unit 106, which follows, linearizes the estimating signal, whereby the distortions which may occur in the case of the neuronal network 104 at the value range ends are suppressed. In addition, a calibrating capability is provided for the linearization unit 106 by means of which static deviations can be corrected, as may be caused by changes of the vehicle load or by the aging of the vehicle tires.

Figure 14:
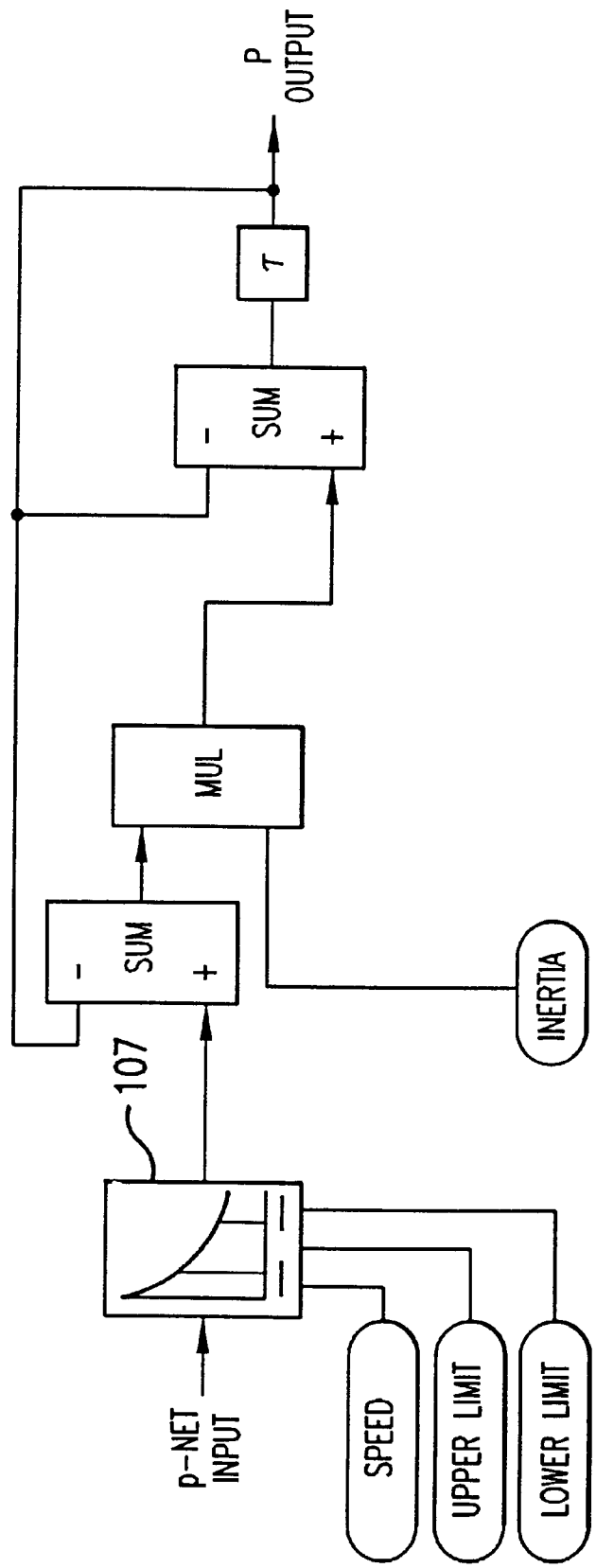
FIG. 14 is a block diagram of a low-pass filter which can be used in the embodiments of FIGS. 11 to 13 connected behind the estimating unit.

The stochastic filter 105 ensures that only pressure prognoses in the trained speed range are analyzed, for the purpose of which the estimated pressure value furnished by the neuronal network 104 is evaluated by a speed window before it is smoothed by a low-pass filter. A construction suitable for this purpose together with the speed window 107 and the connected low-pass components is illustrated in FIG. 14. The "inertia" parameter indicated there determines the limit frequency of the low-pass filter and is selected such that the output signal of the neuronal network 104 is sufficiently smoothed.

Figure 15:
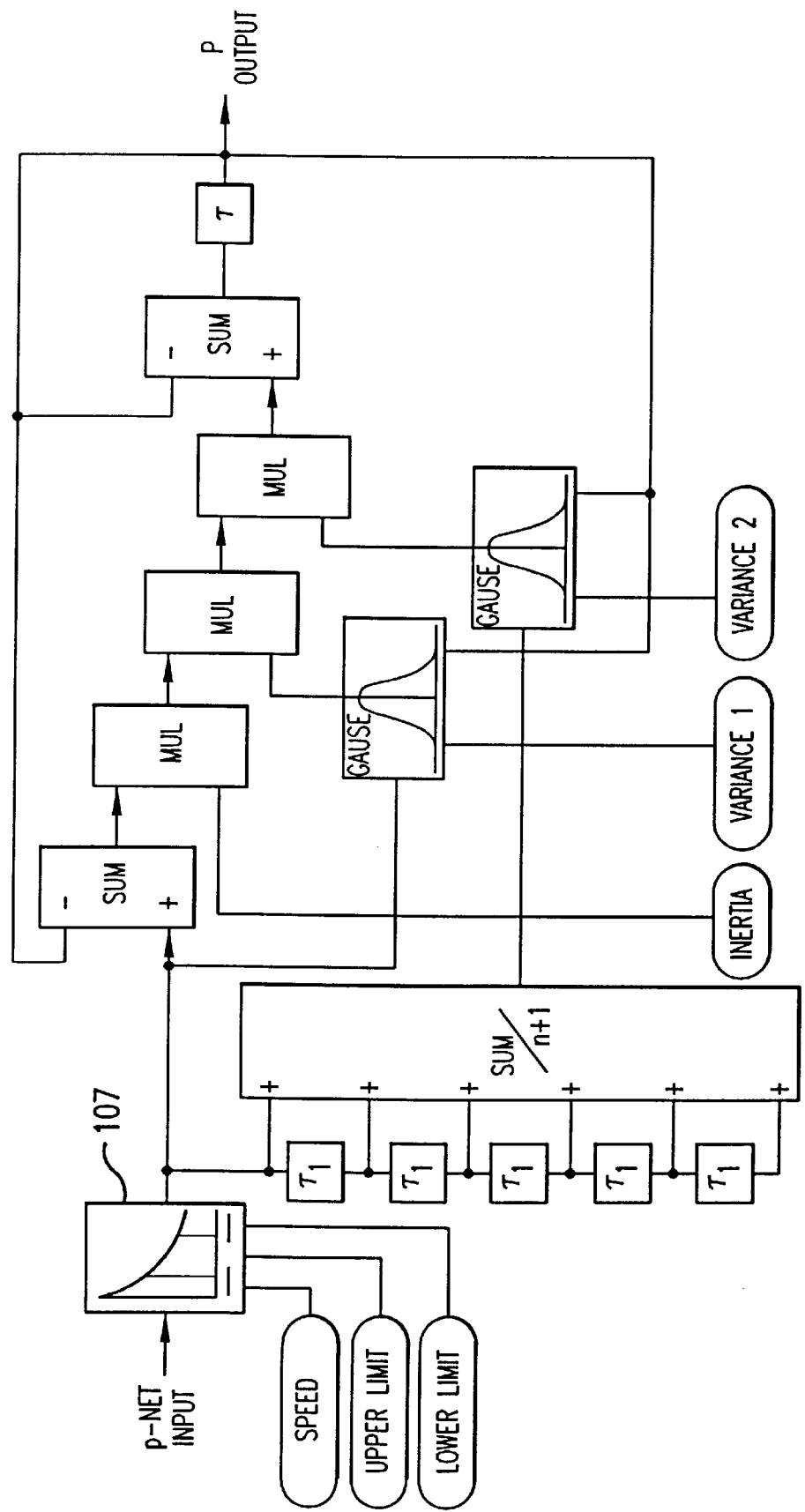
FIG. 15 is a block diagram of a non-linear low-pass filter which can be used in the embodiments of FIGS. 11 to 13 connected behind the estimating unit.

As an alternative to the simple low-pass filter construction according to FIG. 14, a non-linear low-pass filter of the construction illustrated in FIG. 15 can be used after the speed window 107. By means of it, falsifications can be prevented which could otherwise occur if the vehicle were operated for an extended time period in a condition which is not sufficiently covered by previously recorded training examples. For this purpose, a simple low-pass filter would have to obtain a very long time constant which slows down its reaction time. The nonlinear low-pass filter of FIG. 15 uses statistical quantities which are obtained from the output signal of the estimating unit 104, that is, from the neuronal network, in order to adapt the reaction speed of the filter. This measure is based on the fact that a certain portion of the stochastic excitation by the road is also always superimposed as noise on the tire pressure estimation by the neuronal network 104. This noise will be suppressed the more, the better the neuronal network 104 was trained for its tire inflation determination task. Thus the used variances "variance 1" and "variance 2" of the network output signal provide information as to how well the network 104 can process the current situation. In the nonlinear low-pass filter of FIG. 15, this is taken into account by the fact that estimated values which are very far away from the desired tire pressure are evaluated to have a lower value than those which are closer. As a result, the neuronal network 104 can also still be satisfactorily operated in ranges for which it was trained only insufficiently. The "variance 1" parameter indicates how high current deviations are evaluated. In addition, desired value deviations may occur in the operation of the network 104 because of unknown driving situations lasting longer than a limited time period. The "variance 2" parameter uses the average deviation in a time period of, for example, approximately 5 s to 10 s. This effectively suppresses errors based on defined driving maneuvers which are limited with respect to time, such as a braking, acceleration or cornering operation. The desired value required for the evaluation is recursively obtained from the filtered pressure value. In addition, the method of operation is illustrated in a self-explanatory manner in the block diagram of FIG. 15.

The embodiment illustrated in FIG. 12 corresponds to that of FIG. 11 with the exception that the FFT unit 102 and the selection unit 103 are replaced by the system condition determination unit 108 which essentially corresponds to that of the example of FIGS. 1 to 10, in that it computes from the fed, filtered digitized vertical axle acceleration signal a desired number of time derivatives and feeds these to the connecting neuronal network 104 additionally for the vertical axle acceleration as input quantities. The neuronal network 104 is trained according to the process described concerning the example of FIGS. 1 to 10. As a result of this training, the FFT unit 102 and the selection unit 103 of the example of FIG. 11 can be eliminated. Also, a reduced number of input neurons is sufficient, and the whole neuronal network 104 may have a smaller design, which reduces the computing expenditures.

FIG. 13 shows another embodiment of the invention which corresponds to that of FIG. 12 with the exception that the anti-aliasing filter 100 is eliminated. This considerably simplifies the required hardware and reduces the required components to the analog-digital converter 101 and the other illustrated components which can all be implemented on a common microprocessor. In this embodiment, the optimizing algorithm for training the neuronal network 104 is selected such that it is capable of suppressing the errors occurring during the digitizing by violating the scanning theorem on the basis of the omitted anti-aliasing filter 100.

The above description of advantageous embodiments shows that, by means of the system for monitoring vehicle tire pressure according to the invention, a very reliable indirect determination of the tire pressure can be implemented by means of measured vertical acceleration signals of a pertaining vehicle axle or of another vehicle component connected with the respective wheel. It is advantageous in this case that the vertical axle acceleration is a measuring quantity which, like the vehicle speed, is directly available at the wheel by means of conventional sensor systems and has a direct effect on the tire pressure. No changes on the rim or on the wheel bearing are required. In comparison to other tire pressure determination methods, the tire pressure can be determined in a relatively precise and stable manner by means of the system according to the invention. The system can be implemented at comparatively low costs and is capable of determining the tire pressure not only in a relative manner but absolutely and separately for each wheel. The system according to the invention is capable of warning of a tire pressure which is too low; saves corresponding expenditures for a tire pressure test; increases the availability and safety of the vehicle; assists the driver or a motor vehicle pool in maintaining the vehicles and permits a usage control by the vehicle pool as well as an extension of the running performance of the tires by maintaining a desired pressure. Results have shown that, by means of the system according to the invention, the tire pressure can be determined with a precision of ±10%. For twin tires, the system can be designed such that the identification of a pair of tires with a correct and a faulty tire pressure can reliably take place on the basis of the arithmetical mean of both tire pressures.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for monitoring pressure of a vehicle tire, comprising:
    a device for detecting at least a vertical acceleration value related to the tire and a vehicle longitudinal speed value;
    an analyzing device comprising an estimating unit trainable via predeterminable training example data having different tire inflation pressure values and vehicle longitudinal speed values, said estimating unit, in a trained condition, determining a tire inflation pressure at least as a function of the measured vertical acceleration value and the vehicle longitudinal speed value input therein either directly or after preprocessing;
    wherein the system comprises at least one of the following components:
    i) a device for generating road condition information as a function of the measured vertical acceleration and vehicle longitudinal speed values, by which an activation and deactivation of said estimating unit is controlled as a function of whether a momentary measured vertical acceleration and vehicle longitudinal speed values are in each case inside or outside of pertaining predeterminable value ranges;
    ii) a signal post-processing stage connected behind said estimating unit for suppressing estimated values obtained by said estimating unit which are outside a predeterminable trained value range;
    iii) a preprocessing unit comprising an analog-digital converter unit and a post-connected system condition determination unit, said condition determination unit computing one or more time derivatives of the measured vertical acceleration value and feeding said derivatives, in addition to the measured vertical acceleration value, to said estimating unit as input quantities;
    iv) a preprocessing unit comprising an analog-digital converter unit and a post-connected FFT unit having a pertaining selection unit, wherein information selected by said pertaining selection unit is fed as input quantities to said estimating unit;
    v) a data memory usable in a recording phase for recording said training example data instead of said estimating unit, said recorded training example data being stored in the recording phase, and an evaluating and optimizing stage which, in a training phase, is connected behind said estimating unit, wherein in said training phase the estimating unit is connected to the data memory and is trained via the training example data stored therein with a feedback from said evaluating and optimizing stage.

2. The system according to claim 1, wherein the analyzing device is a neuronal network.

3. The system according to claim 1, wherein said preprocessing unit has an anti-aliasing filter coupled in front of said analog-digital converter unit.

4. The system according to claim 2, wherein said preprocessing unit has an anti-aliasing filter coupled in front of said analog-digital converter unit.

5. The system according to claim 1, wherein the preprocessing unit comprises a digital low-pass smoothing filter, coupled behind said analog-digital converter unit, and a high-pass offset filter connected with said digital low-pass smoothing filter.

6. The system according to claim 2, wherein the preprocessing unit comprises a digital low-pass smoothing filter, coupled behind said analog-digital converter unit, and a high-pass offset filter connected with said digital low-pass smoothing filter.

7. The system according to claim 3, wherein the preprocessing unit comprises a digital low-pass smoothing filter, coupled behind said analog-digital converter unit, and a high-pass offset filter connected with said digital low-pass smoothing filter.

8. The system according to claim 4, wherein the preprocessing unit comprises a digital low-pass smoothing filter, coupled behind said analog-digital converter unit, and a high-pass offset filter connected with said digital low-pass smoothing filter.

9. A system for monitoring inflation pressure of a vehicle tire, comprising:

a vertical acceleration sensor and a vehicle longitudinal speed sensor operable to determine vertical acceleration data related to the vehicle tire;

an analyzing unit comprising a trainable estimating unit in the form of a neuronal network, said estimating unit being trained via predeterminable training example data having different tire inflation pressure values and vehicle longitudinal speed values, wherein, in a trained condition, said estimating unit determines the inflation pressure of the vehicle tire at least as a function of the sensed vertical acceleration data and vehicle longitudinal speed data, said vertical acceleration and vehicle longitudinal speed data being fed one of directly and in a preprocessed form to said estimating unit.

10. A method for monitoring tire pressure of a vehicle tire, the method comprising the acts of:

sensing vertical acceleration data related to the vehicle tire;

sensing vehicle longitudinal speed data of the vehicle;

initially training an analyzing device containing a trainable estimating unit, said initial training being performed with predeterminable training example data having different tire inflation pressure values and vehicle longitudinal speed values;

feeding the sensed vertical acceleration data and vehicle longitudinal speed data to said analyzing device; and in the trained condition, determining the tire pressure in the analyzing device at least as a function of said sensed vertical acceleration data and vehicle longitudinal speed data.

11. The method according to claim 10, wherein the act of feeding the data further comprises the act of initially preprocessing the vertical acceleration and vehicle longitudinal speed data prior to feeding said data to said analyzing device.

12. The method according to claim 10, further comprising the acts of:

generating road condition information as a function of said sensed vertical acceleration and vehicle longitudinal speed data; and controlling an activation and deactivation of said estimating unit using said road condition information as a function of whether a momentary sensed vertical acceleration and vehicle longitudinal speed are, in each case, inside or outside of pertaining predeterminable value ranges.

13. The method according to claim 11, further comprising the acts of:

generating road condition information as a function of said sensed vertical acceleration and vehicle longitudinal speed data; and controlling an activation and deactivation of said estimating unit using said road condition information as a function of whether a momentary sensed vertical acceleration and vehicle longitudinal speed are, in each case, inside or outside of pertaining predeterminable value ranges.

14. The method according to claim 11, wherein the preprocessing act further comprises the acts of computing one or more time derivatives of said sensed vertical acceleration value; and feeding said one or more time derivatives, in addition to said sensed vertical acceleration value, to said estimating unit as input quantities.

15. The method according to claim 11, wherein said preprocessing act further comprises the act of selecting information from a post-connected FFT unit having a pertaining selection unit, said information being fed as input quantities to said estimating unit.

* * * * *